United States Patent [19]

Kroll et al.

[11] 4,269,584
[45] May 26, 1981

[54] HOT PELLETIZER FOR EXTRUDERS

[75] Inventors: Walter Kroll, Roethenbach-St. Wolfgang; Günther Stefan, Erlangen-Bruck, both of Fed. Rep. of Germany

[73] Assignee: Leistritz Maschinenfabrik Paul Leistritz GmbH, Nuremberg, Fed. Rep. of Germany

[21] Appl. No.: 16,458

[22] Filed: Feb. 28, 1979

[30] Foreign Application Priority Data

Mar. 7, 1978 [DE] Fed. Rep. of Germany ....... 2809680
Dec. 14, 1978 [DE] Fed. Rep. of Germany ....... 2854024

[51] Int. Cl.³ .............................................. B29C 17/14
[52] U.S. Cl. ..................................... 425/313; 425/311
[58] Field of Search ....................... 425/308, 313, 311; 264/142

[56] References Cited

U.S. PATENT DOCUMENTS

| 2,401,236 | 5/1946 | Fielitz | 425/313 |
| 3,349,433 | 10/1967 | Schippers et al. | 425/313 |
| 3,415,917 | 12/1968 | Watanabe et al. | 264/142 |
| 3,482,277 | 12/1969 | Koch | 425/308 |
| 3,874,835 | 4/1975 | Roissiter et al. | 425/313 |
| 3,981,959 | 9/1976 | Cuff | 264/142 |

FOREIGN PATENT DOCUMENTS 657944 7/1965 Belgium .................................. 425/313

Primary Examiner—James H. Derrington
Attorney, Agent, or Firm—Jordan and Hamburg

[57] ABSTRACT

A pelletizing device for use with an extruder has a die plate through which a plastic ribbon is extruded, and a milling cutter is rotatably mounted at the die plate for cutting successive pellets from the extruded ribbon as the latter exits from the die plate. Means defining a channel carrying a cooling medium is located below the milling cutter and receives the pellets cut by the milling cutter, the cooling medium cooling the pellets and carrying the pellets away.

16 Claims, 4 Drawing Figures

HOT PELLETIZER FOR EXTRUDERS

BACKGROUND OF THE DISCLOSURE

This invention relates to hot pelletizers for extruders wherein there is provided a cutting rotor rotating in front of the dies serving to extrude the plastic ribbons, and a colling device for spraying the cutting rotor with a cooling medium such as water.

Hot pelletizers are already known for the prevention of difficulties with hardened plastic elements when they tear or break while exiting out of dies and also for the prevention of adhesion between the pellets. In such pelletizers, a cutting rotor cuts the emerging plastic ribbons before they are solidified, on the one hand, and when they have, on the other hand, sufficiently emerged for the desired pellet size. In order to prevent the sticking together of the pellets it is necessary to cool them immediately after separation which is done by spraying the cutting rotor with a colling fluid.

The heretofore known hot pelletizers are furnished with rotating knives whereby single knives may be arranged so that they may be easily exchanged when damaged or may be reground when needed. These devices are extremely difficult to handle in regard to the setting and adjustment of the cutting knives in addition to the danger brought about by the conventional method of spraying that individual pellets, which are still soft, adhere and agglomerate, thereby making the pellitizer and the consecutive drying devices inoperable. Furthermore, it has been found in practical experience that even intensive spray-cooling does not prevent pellets from sticking together at the bottom. Increased cooling, on the other hand, causes the danger of slowly plugging-up of the die.

SUMMARY OF THE INVENTION

In order to prevent all of these difficulties, the present invention of a hot pellitizer uses a milling cutter instead of a cutting rotor and forms the bottom of the pelletizing chamber as a channel for fast flowing water, the channel extending in an axial direction of the milling cutter and the water serves as an additional cooling medium and also for the discharge of the pellets.

The use, according to the invention, of a plan milling cutter prevents, in contradistinction to the heretofore known devices, the difficulties when adjusting the cutting rotor relative to the extrusion dies. it was found that even when forgoing the regrinding of the cutting edges of the milling cutter, which is necessary as deduced from the investigations upon which the present invention is based, because otherwise the adjustment problem would also occur, would not cause practically any increased costs caused by having to discard the milling cutter when the cutting edges have become dull. For the hot pelletizers according to the invention, it is possible to easily use commercially available milling cutters because they are always cheaper than specialized cutting rotors with exchangeable knives in that they are standardized and therefore easily manufactured in large quantities.

On hot pelletizers of the aforementioned kind there is utilized an arrangement where a plurality of extrusion dies are arranged in a row in a plate so that one single rotating cutter saves simultaneously a plurality of pellets from just a many extruded ribbons. The use of milling cutters according to the present invention, instead of rotating knives with exchangeable knives, offers the added advantage that the use of milling cutters with cutting edges in a spiral shaped arrangement allows a working method where pellets of vicinally extruded plastic ribbons are not chopped off simultaneously, but successively, thereby reducing the danger of their sticking together. This reduces greatly the danger of sticking together immediately after the severing at the outlet of the die where the pellets still possess the highest degree of plasticity and thus adhesiveness.

According to the present invention, the aforementiond danger of agglutination of the pellets when leaving the pelletizer may be quantitatively removed by forming the bottom of the pelletizer housing as a channel, preferentially extending along the axis of the milling cutter, for further cooling and for the removal of the cooling medium carrying the pellets. The pellets fall into the rapidly flowing stream of cooling fluid after having been cut off, where they are cooled momentarily by thermal shock so that in any case superficial sticking together is prevented. Furthermore, this method provides a quick and trouble free removal from the pelletizer without the danger of adhesion of the pellets to the walls.

In order to allow a particularly simple mounting of the pelletizer in front of any extruder and to further increase its life expectancy, a further embodiment of the invention provides for supports of the milling cutter which are adjustable relative to the die plates and also that the milling cutter consists of a material considerably harder than the material out of which the die plate is made.

This additional embodiment is based upon the concept that the use of a material for the milling cutter, substantially harder than for the die plate, creates a self-sharpening system where the milling cutter advances into the die plate due to the ever present contact pressure so that, independent of the continual unavoidable wear of the die mouths, smooth clean die-edges are present, so that smooth ribbons are extruded and quality pellets are produced.

This adjustable feature of the milling cutter is particularly advantageous in that the housing of the pelletizing chamber enclosing the milling cutter including its drive mechanism and the exit channel may be pivotably disposed around an axle parallel to the axle of the milling cutter in front of the die plate at the extruder.

This open embodiment where the die plate fills the opening of the pelletizer chamber housing results not only in an exact parallel disposition of the axle of the milling cutter and plane of the die plate by constructing both bearings of the pivotal axis horizontally and vertically adjustable, but enables the user also to adjust the height of the milling cutter axle so that it lies exactly in the horizontal plane of the die emerging bore holes of the die. Furthermore this pivotable support with adjustable supports allows a particular simple mounting for a hot pelletizer to any extruder.

The desired nominal distance between milling cutter and die plate is ensured in an additional embodiment, by providing a fine adjusting spindle for fixing the distance of the milling cutter fastened to the extruder or better still to the die plate. An arresting device, of course, may be provided for arresting the housing of the pelletizing chamber including the therein housed milling cutter relative to the extruder, so that these implements cannot be separated from the die plate.

While preparing, as aforementioned, the milling cutter from a harder material than the one the die plate is made of, it was found to be particularly advantageous to use high speed tool steel for the milling cutter and either rust-resistant or acid-resistant steel or bronze for the die plate.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
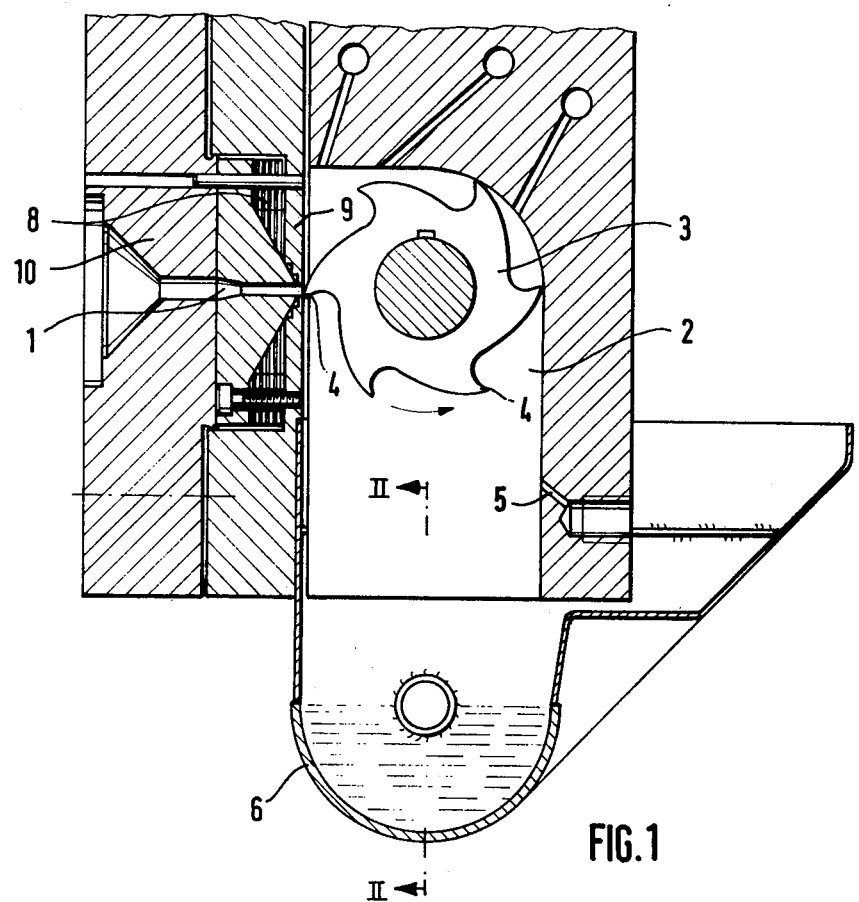
FIG. 1 is a vertical cross sectional view taken through a pelletizer according to one embodiment of the invention and taken in a plane perpendicular to the axis of the milling cutter.
Figure 2:
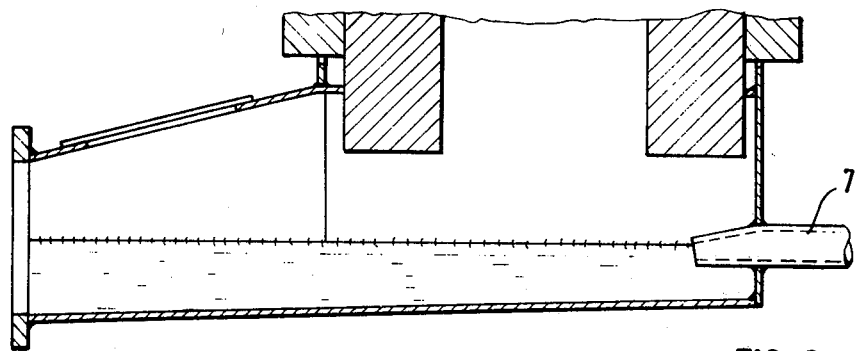
FIG. 2 is a partial cross sectional view taken along the line II—II in FIG. 1.

Referring to the drawings there is schematically shown in FIG. 1 a hot chopping pelletizer which is joined at the left side thereof to a plastic extruder having an extruding screw (not shown). The pelletizer has a plurality of discharge channels 1 arranged in a line vertical to the plane of the drawing, opening into a pelletizing housing or chamber 2. In this pelletizing chamber 2 there is rotatably supported a milling cutter 3 connected to a non-illustrated driving means. The rotary speed of the milling cutter 3 is adjusted so that the time period between the passing of one cutting edge 4 past the discharge channel, and the passing of the next cutting edge 4 takes as long as the extrusion of a ribbon of a length appropriate for the desired pellet size. It is particularly advantageous to arrange the cutting edges 4 in the form of such a spiral that the pellets are cut from the adjacent dies not simultaneously but successively. This method reduces considerably the danger of sticking together the pellets while they are being cut off, as they are still very soft and sticky at this time.

The milling cutter 3 is sprayed constantly at an angle from below by spray nozzles 5 with finely atomized liquid, for example, water. This aids in a further distribution of the water by impinging upon the milling cutter so that the interior of the pelletizing chamber 2 is substantially filled with a mixture of water and water vapor. This results in a substantial lowering of temperature, considering that the conventional extrusion temperatures of plastics is in a range of 150°–250° C. (300°–480° F.), and also brings the temperature down to a level for at least hardening the surfaces of the pellets.

Spraying the milling cutter 3 obliquely from below has the additional advantage that the impinging cooling means, usually water, washes off pellets which might have gotten stuck to the milling cutter so that they are prevented from disturbing the operation of the device.

The bottom 6 of the pelletizing chamber 2 is formed as a channel into which fast moving cooling means or liquid is fed by an intake 7. The separated pellets drop or fall freely into the cooling means, are simultaneously cooled by shock, and are carried out free from problems out of the pelletizing chamber.

Thermal insulating discs 8 insulate the die plate 9 on its chamber side against the extrusion part 10 which has to be hot. This method prevents the danger of plug development in the die channels 1.

Figure 3:
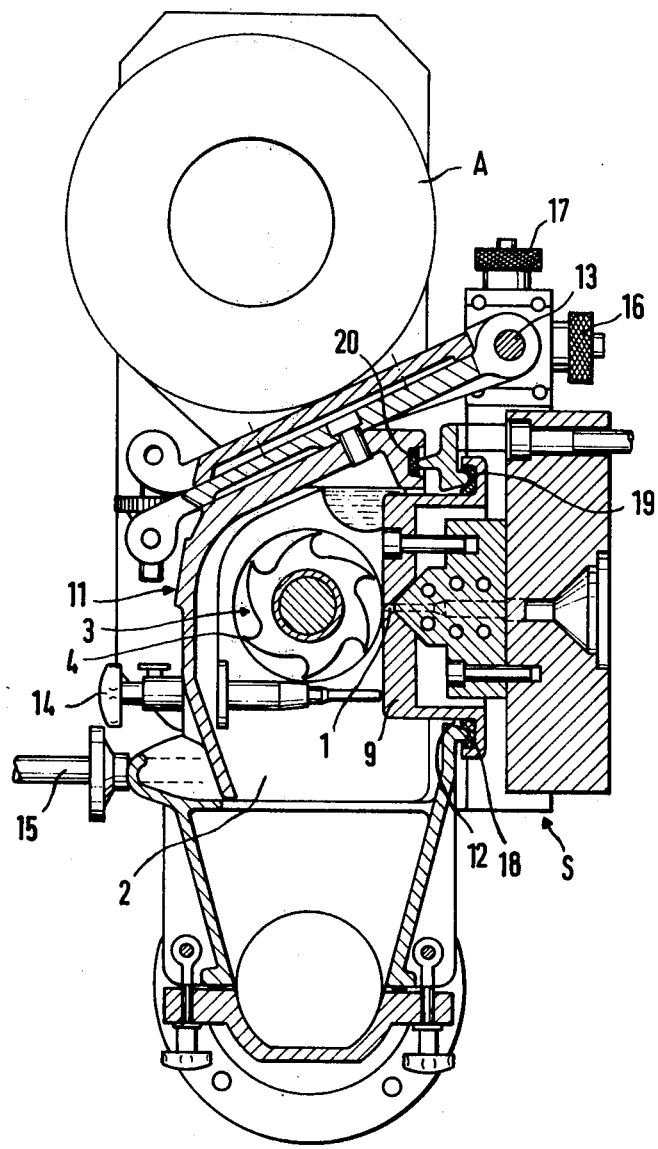
FIG. 3 is a vertical cross sectional view taken through a hot pelletizer according to another embodiment of the invention in a plane perpendicular to the axle of the milling cutter.
Figure 4:
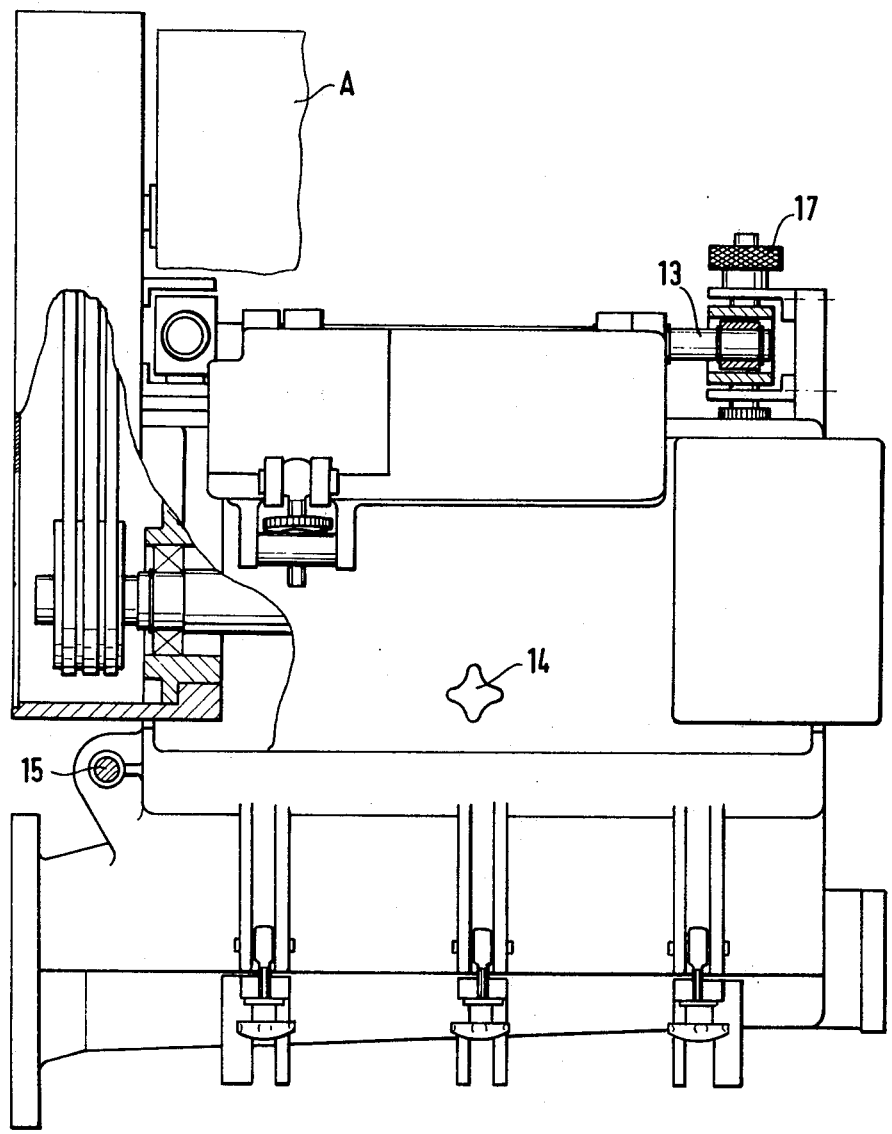
FIG. 4 is a vertical view, partially cut away and in cross section, of the device shown in FIG. 3.

FIGS. 3 and 4 show schematically the front of an extruder 5 with the die plate 9 forming the frontal end with the discharge channels 1. There are a plurality of discharge channels 1 disposed parallel to each other, that is vertical to the plane of the drawing in FIG. 3. The die discharge channels 1 open into a pelletizing chamber 2 within which a milling cutter 3 is pivotably supported. The milling cutter 3 is connected to a driving mechanism indicated generally at A. The rotatory speed of the milling cutter 3 is adjusted so that the time span between the passing of one cutting edge 4 past the extrusion dies and the passing of the next cutting edge 4 is only as long as it suffices to extrude a ribbon of the size of the desired pellet.

The milling cutter 3 is pivotably supported in a housing 11 which has a projection received in the recess 12 of the die plate 9. The housing 11 is mounted on an axle 13, which is parallel to the axis of the milling cutter 3. The distance of the milling cutter 3 from the die plate 9 may be adjusted by a fine adjustment spindle 14. The exact parallelity of the milling cutter axle and the die plate 9 is assured by providing both bearings of the pivoting axle 13 with horizontal and vertical verniers 16 and 17.

The material for the milling cutter 3 is considerably harder than the material used for the die plate 9. Preferably, the milling cutter is made of high speed tool steel, and the die plate 9 may be made of rust-resistant or acid-resisting cast steel or bronze.

Gaskets 18, 19, and 20 are provided for the needed gasketing of the pelleting chamber housing 11 which is pivotably disposed in front of the die plate. These gaskets are built and arranged in such a manner that they allow the moving of the milling cutter by at least a few millimeter in the direction of the die plate 9 in order to create a self-sharpening system where the hard milling cutter advances itself slowly into the softer die plate.

The invention is not restricted to the illustrated embodiments. Particularly characteristic of the present invention is the two-step cooling of the pellets, once by the mixture of steam and finely divided water droplets in the discharge area of the dies. This prevents plugging up of the dies quantitatively, as would occur when the cooling is too effective, particularly when working immediately under water. The second cooling step occurs when the pellets drop into the cooling means serving simultaneously for the transport out at the bottom of the pelletizing chamber.

Furthermore, the adjustable positioning of the milling cutter 3 relative to the die plate could be obtained by other methods, but the pivotable support is particularly advantageous due to its simple adjustability and it universal capability of being mounted to a wide variation of extruders.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A pelletizing device for use with an extruder comprising a die plate through which a plastic ribbon is extruded, said die plate having means defining a plurality of extrusion openings through which the plastic ribbon is extruded, said plurality of openings having their axes disposed in aligned parallel array and in a common, generally horizontal plane such that said openings are disposed at generally the same elevation, a rotatable spiral cutter having spiral cutting edges, said spiral cutter having an axis of rotation disposed generally horizontally and generally perpendicular to the longitudinal axes of said extrusion openings, said openings having their axes intersecting said axis of rotation of said spiral cutter, said spiral cutting edges being spirally disposed about the axis of rotation of said spiral cutter, said spiral cutter being disposed and arranged relative to the openings of said die plate to cut pellets from the ribbons emerging from adjacent die openings in a successive and non-simultaneous manner to thereby reduce the opportunity for just-cut pellets to adhere to one another, and means defining a channel containing a cooling liquid, said channel being disposed to underlie said spiral cutter so that the pellets upon being cut by said spiral cutter fall freely by gravity into said cooling liquid in said channel to be rapidly cooled by thermal shock so as to preclude adhesion between the pellets.

2. A pelletizing device according to claim 1 comprising means defining a housing in which said spiral cutter is rotatably mounted, said channel being located at the bottom of said housing.

3. A pelletizing device according to claim 2 wherein said channel is elongated with its longitudinal axis extending generally parallel to the axis of the spiral cutter, said cooling medium flowing in said channel in the directions of said longitudinal axis of said channel.

4. A pelletizing device according to claim 3 comprising means for feeding a flowing stream of cooling medium to said channel such that the flowing stream carries the cut pellets therewith longitudinally along said channel.

5. A pelletizing device according to claim 2 further comprising spray means located in said housing for spraying a cooling medium onto said spiral cutter, said spray means being located in a wall of said housing opposite said die plate and spraying said cooling medium in an upwardly oblique direction.

6. A pelletizing device according to claim 5 wherein said spray means sprays water such that a steam-water droplet mixture of an elevated temperature is provided so that plugging of the extrusion passage in the die plate is prevented.

7. A pelletizing device according to claim 1 wherein said spiral cutter is made of a material which is harder than the material from which the die plate is made such that during engagement between the spiral cutter and the die plate, the milling cutter will be self-sharpening.

8. A pelletizing device according to claim 7 wherein said spiral cutter is made of high speed tool steel and said die plate is made of cast steel.

9. A pelletizing device according to claim 7 wherein said spiral cutter is made of high speed tool steel and said die plate is made of bronze.

10. A pelletizing device according to claim 2 wherein said housing encloses and rotatably supports said spiral cutter, and pivotable means pivotably supporting said housing with the pivotal axis of said pivotal means being parallel to the axis of the spiral cutter.

11. A pelletizing device according to claim 10 wherein said pivotable means comprises bearings for pivotably supporting a pivotal shaft, and adjustable means for horizontally and vertically adjusting the position of said bearings.

12. A pelletizing device according to claim 10 further comprising means for positioning the housing relative to the extruder.

13. A pelletizing device according to claim 10 further comprising a fine adjusting means mounted on said housing means for fine adjusting the position of the spiral cutter relative to the die plate.

14. A pelletizing device according to claim 13 further comprising gasket means between said housing and said extruder to provide for adjusting the position of the housing relative to the extruder.

15. A pelletizing device according to claim 10 further comprising drive means for rotating said spiral cutter, said drive means being mounted on said housing for pivotal movement therewith.

16. A pelletizing device according to claims 10 wherein said channel means is detachably mounted on said housing.

* * * * *